Feb. 15, 1938.  A. D. EITZEN  2,108,056
NEWS PROJECTING MACHINE
Original Filed March 15, 1934   3 Sheets-Sheet 2
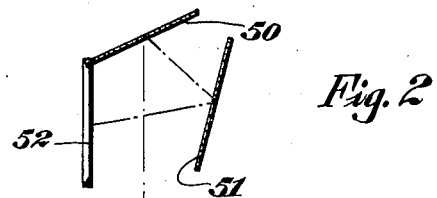
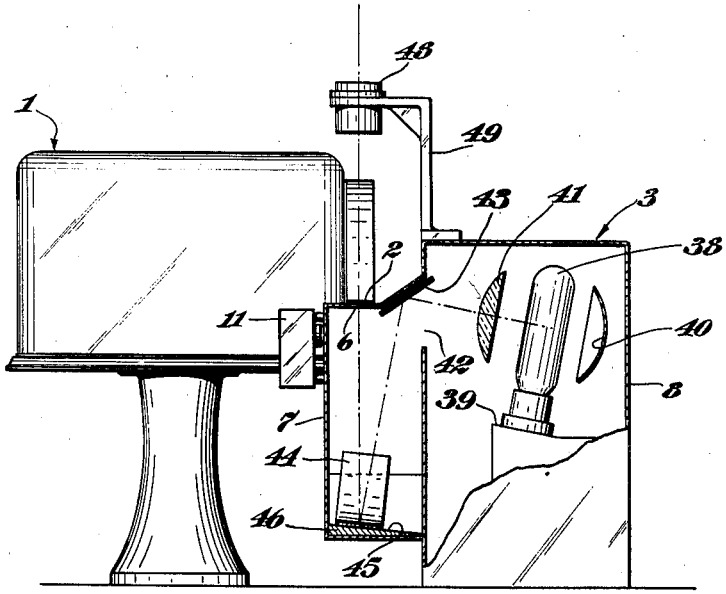
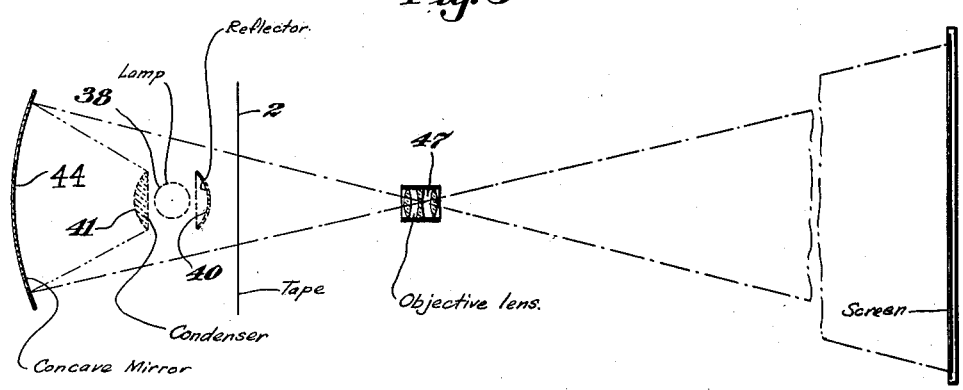
INVENTOR
*August D. Eitzen,*
BY
*Gustav Drew*
ATTORNEY

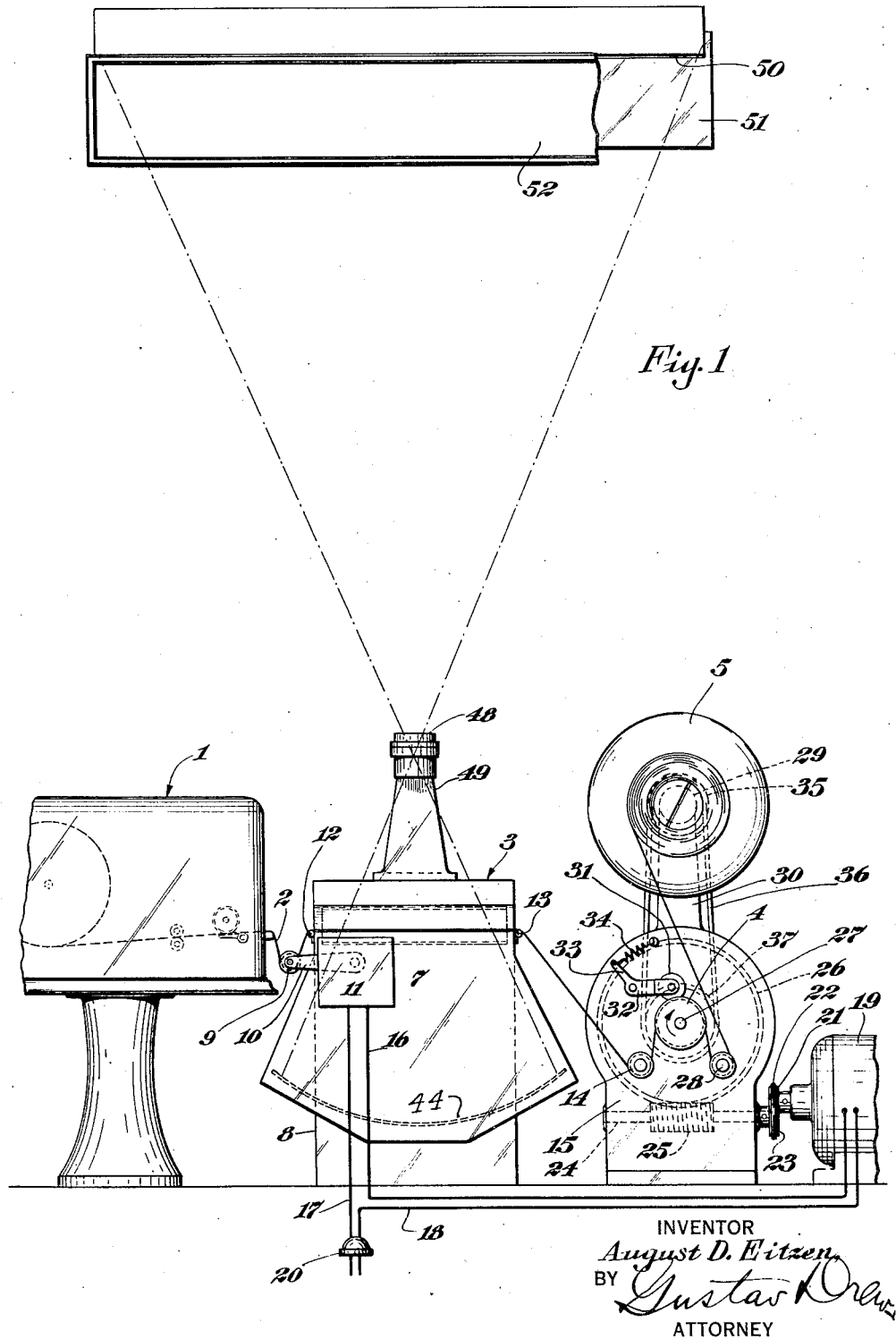

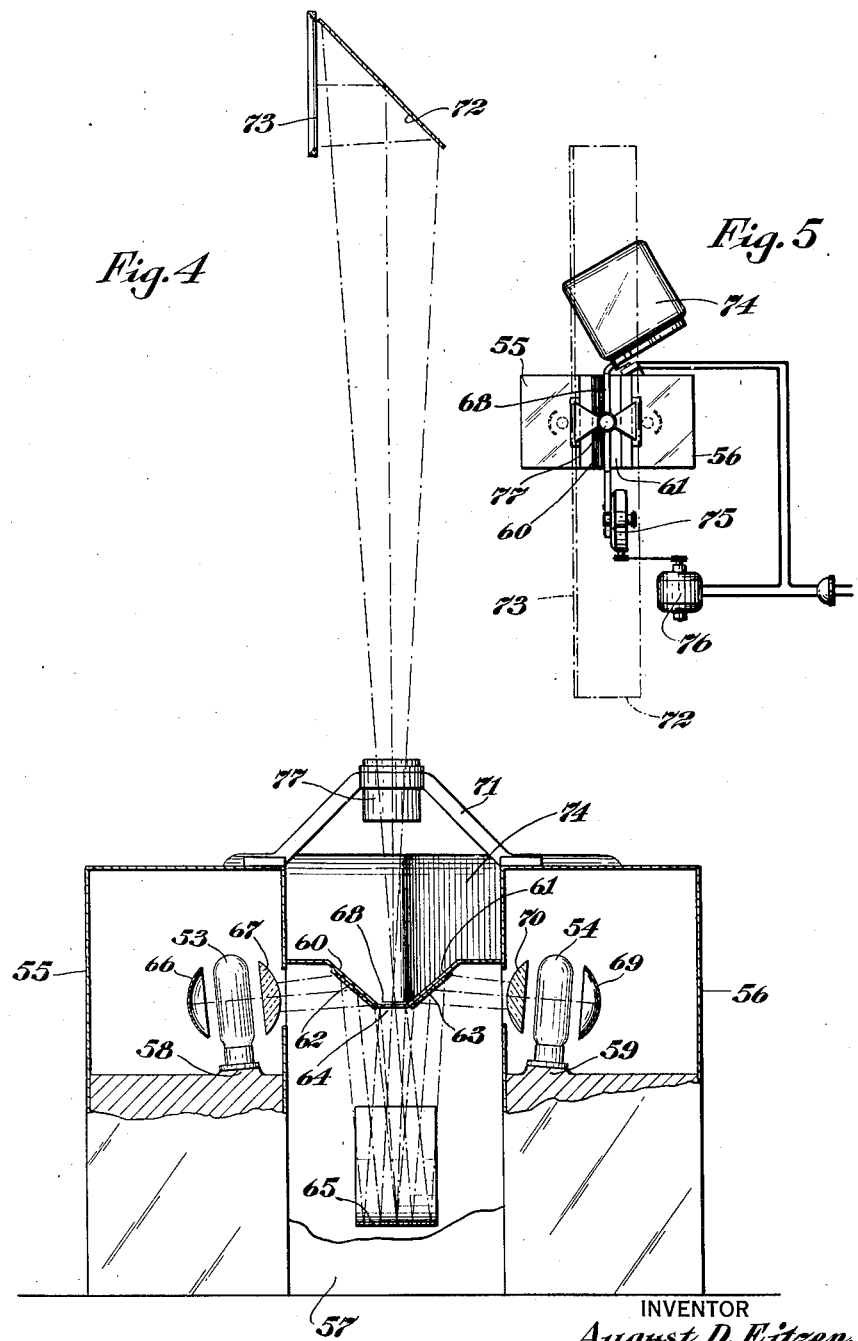

Patented Feb. 15, 1938

2,108,056

UNITED STATES PATENT OFFICE 2,108,056

NEWS PROJECTING MACHINE

August D. Eitzen, Rockville Centre, N. Y., assignor to News Projection Corporation, New York, N. Y., a corporation of New York Application March 15, 1934, Serial No. 715,588
Renewed April 3, 1937

19 Claims. (Cl. 88—24)

This invention relates to news projection machines in general.

Among the objects of the present invention, it is aimed to provide a news projection machine having an improved optical system by which a long narrow beam of light may with facility be projected so that a long strip of tape may be illuminated for projection.

It is still another object of the present invention to provide an improved optical system by means of which for a given projection of readable matter, the loss of light rays may be reduced to a minimum and on the other hand an unusually extensive cross section of beam of standard effectiveness produced.

It is still another object of the present invention to provide an improved optical system particularly adapted for use with a news projection machine using a plurality of sources of light to produce a plurality of beams of light eventually guided through one and the same long light aperture whereby an effective projection may be obtained of a long strip of reading matter of a desired brilliance.

It is a still further object of the present invention to provide an improved news projection machine having an optical system provided with a comparatively long light aperture, two lamps, and reflecting means including an arcuate mirror for receiving the light rays from said lamps and directing them through said light aperture to form converging light rays.

These and other features, capabilities and advantages of the invention will appear from the subjoined detail description of specific embodiments thereof illustrated in the accompanying drawings in which.

Figure 1 is a fragmental front elevation of a projection machine made according to one embodiment of the present invention;

Fig. 2 is an end elevation partly in section of the embodiment illustrated in Fig. 1;

Fig. 3 is a diagram showing in a general way the path of the light rays from a single lamp to the screen;

Fig. 4 is a fragmental end elevation partly in section of another embodiment of the present invention; and Fig. 5 is a plan view on a similar scale of the embodiment illustrated in Fig. 4.

In the embodiment illustrated in Figs. 1 and 2, there is shown a ticker 1 illustrative of the high speed type today extensively used from which the tape 2 passes to the projection machine 3, then to the tape puller 4 and finally to the rewind reel 5.

The projection machine 3 has a light aperture 6 in the present instance formed at the top of the extension 7 of the lamp housing 8. Across the light aperture 6, the tape passes after passing under the roller or finger 9 of the control lever 10 of the standard switch box 11. Preferably at the entrance to the light aperture 6, there is formed a roller or idler 12 and at the discharge end of the light aperture 6, there is formed an idler 13, the tape 2 passing from the roller or finger 9 to the idler 12 and then across the light aperture 6 to the idler 13 and then down to the idler 14 on the housing 15 of the tape puller 4.

The control lever 10 controls the switch in the switch box 11 of the circuit formed by the conductors 16, 17 and 18 of the motor 19, the conductors 17 and 18 being connected to the outlet plug 20. The motor 19 is drivingly connected to the tape puller 4, it having a sheave 21 connected by the belt 22 with the sheave 23 on the shaft 24 having the worm 25 in mesh with the worm wheel 26 on the shaft 27 of the tape puller roller constituting the tape puller 4. The tape 2 passes from the idler 14 across the tape puller 4 and then down and around the idler 28 and finally up on the rewind reel 5 mounted on the shaft 29 journaled in the upper end of the bracket 30 extending upwardly from the housing 15.

The tape 2 is maintained in frictional engagement with the tape puller 4 by the pressure roller 31 journaled in the end of the lever 32 pivotally connected to the housing 15 and having an arm 33 connected by the spring 34 with a suitable abutment on the housing 15 to urge the pressure roller 31 into engagement with the tape 2 on the pulling roller 4.

For driving the rewind reel 5, the sheave 35 mounted in the shaft 29 is connected by the spring belt 36 or the like with the sheave 37 fixed on the shaft 27. The control lever 10 in the usual way makes contact and establishes the circuit for the motor 19 when deflected by the tape 2 upon the operation of the ticker 1 and breaks the circuit to shut off the current to the motor 19 when the loop is shortened upon the arrest of the ticker 1 thereby in turn to stop the tape puller 4 and rewind reel 5.

In the lamp housing 8, there is mounted in the present instance, the lamp 38 preferably on a support having an inclined upper face 39 so that the light rays from the lamp by means of the reflector 40 and the condensing lens 41 may be directed in an upwardly inclining direction through the opening 42 in the lamp housing 8 to the deflecting means, the mirror 43 extending into the extension 7. By means of which mirror 43, the light rays are directed downwardly upon the arcuate deflecting means, the mirror 44 formed on the inclined face 45 of the support 46 positioned at the bottom of the extension 7.

The arcuate mirror 44, in the present instance, see Fig. 1, is longer than the width of the lamp housing 8. The diverging light beam, see Fig. 3, formed by the lens 41 strikes substantially the full length of the mirror 44 and is then deflected upwardly through the tape 2 located at the light aperture 6 and the resulting initial impressed light beam then directed through the objective lens unit 47 formed in the housing 48 mounted at the end of the bracket 49 extending upwardly from the top of the housing 8.

From the projection lens unit 47, the image impressed light beam passes to the mirror 50, then onto the mirror 51 and finally onto the rear face of the rear projection screen 52, emerging as an upright readable picture on the front face of the screen 52.

The embodiment illustrated in Figs. 4 and 5 discloses the use of a plurality of sources of light whereby the light beam will appear intensified. The specific construction discloses two lamps 53 and 54 mounted in the lamp housings 55 and 56 respectively spaced from one another by an intermediate housing 57.

The lamps 53 and 54 in the present instance are mounted upon bases 58 and 59 respectively having inclined upper faces so that the lamps 53 and 54 are inclined from the vertical. The top of the housing 57 is provided with two inclined wall portions 60 and 61, to the lower faces of which are secured the mirrors 62 and 63 spaced from one another to form a light aperture at 64. Below the light aperture 64, there is mounted the arcuate or concave cylindrical mirror 65, the arc of which is concentric to an axis that extends substantially horizontally. The lamp 53 cooperates with the reflector 66 and condensing lens 67 to direct rays of light onto the mirror 62 by which they are deflected downwardly onto substantially one half of the arcuate mirror 65 and by it deflected upwardly through the light aperture 64 across which the tape 68 is directed to move.

The reflector 69 and condensing lens 70 in turn cooperate with the lamp 54 to direct rays of light onto the mirror 63 and by the latter deflected downwardly onto the other half of the arcuate mirror 65 to be deflected upwardly through the tape 68, coinciding with and intensifying the light collected from lamp 53.

The combined light rays received by the mirror 65 are divergent after leaving the condensers 67 and 70 and then are converged by the mirror 65 to coincide and intensify one another at the light aperture 64 and pass through the tape 68 into the objective lens unit in the housing 77 mounted in the bracket 71 secured to the upper ends of the lamp housings 55 and 56. The image impressed light beam then passes onto the mirror 72 and by it is deflected onto the rear projection screen 73 finally emerging as an upright readable picture on the front face of the screen 73.

In the present instance, the ticker 74, see Fig. 5, is disposed at an angle to the direction of movement across the light aperture 64 and the tape twisted after leaving the ticker 74 and before passing to the light aperture 64 so that its printed side faces downwardly. With such an arrangement of the tape, a single mirror 72 is sufficient to produce an upright readable picture on the front face of the screen 73.

In the embodiment illustrated in Figs. 1 and 2, the tape passes from the ticker with its printed side facing upwardly in its normal position and therefore as illustrated two mirrors 50 and 51 are required to produce an upright readable picture on the front face of the screen 52.

With the second embodiment, the tape 68 after leaving the light aperture 64 is received by a tape puller substantially identical to the tape puller 4 illustrated in Fig. 4 and finally received on the rewind reel 75, the rewind reel 75 and tape puller of this embodiment being drivingly connected to the motor 76 in the usual way similar to that illustrated in the embodiment of Fig. 1.

It is obvious that various changes and modifications may be made to the details of construction without departing from the general spirit of the invention as set forth in the appended claims.

I claim:

1. The combination with an elongated light aperture for receiving marked tape, a source of light, and means including a mirror longer than and spaced from said light aperture, having an arcuate surface concentric to the axis thereof and disposed in longitudinal alinement with the path of travel of the tape for receiving the light rays from said source of light and directing them through the tape at said light aperture, the axial length of which mirror is shorter than the arcuate length thereof.

2. The combination with a light aperture for receiving marked tape, of a source of light, an arcuate mirror disposed in alinement with the path of travel of the tape, and a plane mirror disposed between said source of light and said light aperture to intercept the light rays from said source of light and direct them at said arcuate mirror to be in turn directed by said arcuate mirror through the tape at said light aperture.

3. The combination with a light aperture for receiving marked tape, of two lamps on opposite sides of said light aperture, an arcuate mirror disposed in alinement with the path of travel of the tape between said lamps and facing said light aperture, two plane mirrors on opposite sides of said light aperture, each plane mirror disposed between one of said lamps and said arcuate mirror to intercept the light rays from said source of light and directing them at said arcuate mirror to be in turn directed by said arcuate mirror through the tape at said light aperture.

4. The combination with a light aperture for receiving marked tape, of a source of light to one side of said light aperture, a concave mirror disposed in alinement with the path of travel of the tape facing said light aperture, and means including a plane mirror inclined to said light aperture for intercepting the light rays from said source of light and directing them at said concave mirror in turn to be directed through the marked tape at said light aperture.

5. The combination with a light aperture for receiving marked tape, of a source of light, a concave mirror in alinement with the path of travel of the tape facing said light aperture but concentric to an axis inclined to the plane of said light aperture, and means including a plane mirror for intercepting the light rays from said source of light and directing them at said concave mirror in turn to be directed through the marked tape at said light aperture.

6. The combination with a light aperture for receiving marked tape, of a source of light, a concave mirror in alinement with the path of travel of the tape facing said light aperture but concentric to an axis inclined to the plane of said light aperture, and means including a plane mirror inclined to the plane of said light aperture for intercepting the light rays from said source of light and directing them at said concave mirror in turn to be directed through the marked tape at said light aperture.

7. The combination with a light aperture for receiving marked tape, of two lamps, a concave mirror disposed in alinement with the path of travel of the tape between said lamps and facing the marked tape at said light aperture, and means including plane mirrors inclined to the plane of said light aperture to intercept the light rays from said lamps and direct them at said concave mirror in turn to be directed through the marked tape at said light aperture.

8. The combination with a light aperture for receiving marked tape, of a plurality of lamps, a concave mirror in alinement with the path of travel of the tape facing the marked tape at said light aperture, means including plane mirrors inclined to the plane of said light aperture to intercept the light rays from said lamps and direct them at said concave mirror in turn to be directed through the marked tape at said light aperture.

9. The combination with a light aperture for receiving marked tape with the printed matter facing toward said light aperture, of two lamps inclined to the plane of said light aperture, a concave mirror in alinement with the path of travel of the tape facing the marked tape at said light aperture, and means including plane mirrors inclined to the plane of said light aperture to intercept the light rays from said lamps and direct them at said concave mirror in turn to be directed through the marked tape at said light aperture.

10. The combination with a light aperture disposed in a horizontal plane for receiving marked tape with the printed matter facing downwardly, of two lamps inclined to the plane of said light aperture, one lamp to each side of said light aperture, a concave mirror disposed in alinement with the path of travel of the tape beneath said light aperture and facing said light aperture, and means including plane mirrors inclined to the plane of said light aperture to intercept the light rays from said lamps and direct them at said concave mirror in turn to be directed through the marked tape at said light aperture.

11. The combination with a light aperture for receiving marked tape with the printed matter facing away from said light aperture, of a lamp inclined to the plane of said light aperture, a concave mirror disposed in alinement with the path of travel of the tape below and facing the marked tape at said light aperture, and means including a plane mirror inclined to the plane of said light aperture to intercept the light rays from said lamp and direct them at said concave mirror in turn to be directed through the marked tape at said light aperture.

12. The combination with a light aperture disposed in a horizontal plane for receiving marked tape with the printed matter facing upwardly, of a lamp inclined to the plane of said light aperture, a concave mirror disposed in alinement with the path of travel of the tape below and facing the marked tape at said light aperture, and means including a plane mirror inclined to the plane of said light aperture and disposed between said lamp and said concave mirror to intercept the light rays from said lamp and direct them at said concave mirror in turn to be directed through the marked tape at said light aperture.

13. The combination with an elongated light aperture for receiving marked tape, of a source of light, and means including an elongated mirror longer than, spaced from, and in longitudinal alinement with, said light aperture and having a concave cylindrical surface, the altitude of which is shorter than the curved line perpendicular to such altitude interposed in the path of the light rays from said source to said tape to receive and direct the light rays from said source to said tape to produce an image impressed beam of light rays that converges laterally relative to the markings on the tape.

14. The combination with an elongated light aperture for receiving a length of marked tape, of a source of light, and means including an elongated mirror longer than, spaced from, and in longitudinal alinement with, said light aperture and having a concave cylindrical surface, the altitude of which is shorter than the curved line perpendicular to such altitude interposed in the path of the light rays from said source to said tape to receive a beam of light rays from said source and converge it longitudinally of said length of tape to illuminate a maximum length of tape with a minimum loss of light rays to produce an image impressed beam of light rays.

15. The combination with an elongated light aperture for receiving a length of marked tape, of a source of light, and means including an elongated mirror longer than, spaced from, and in longitudinal alinement with, said light aperture and having a concave cylindrical surface, the altitude of which is shorter than the curved line perpendicular to such altitude interposed in the path of the light rays from said source to said tape and at an oblique angle to the path of said light rays to receive a wide beam of light rays and converge it longitudinally of said length of tape to illuminate a maximum length of tape with a minimum loss of light rays to produce an image impressed beam of light rays.

16. In an optical system, the combination with a transparent tape having markings thereon, of means including a source of light for directing a wide beam of light, an elongated cylindrical concave mirror, the altitude of which is shorter than the length of the curved line perpendicular to such altitude, for intercepting the wide beam of light and directing it through said tape to form an image impressed light beam that is converging laterally relative to the message formed by the markings on the tape, a screen, and an objective lens unit for receiving the image impressed light beam so produced and diverging and directing it at said screen.

17. In an optical system, the combination with a light transmitting master, of a plurality of light sources, means including a concave cylindrical reflecting face for directing a plurality of light beams through a common area of said master to coincide and intensify one another subsequently to emerge as a combined image impressed light beam, and a screen for receiving the image impressed light beam so produced.

18. In an optical system, the combination with a light transmitting master, of means including a concave cylindrical reflecting face for directing a plurality of light beams through a common area of said master to coincide and intensify one another subsequently to emerge as a combined image impressed light beam, and a screen area for said image impressed light beam and for receiving the image impressed light beam so produced.

19. In an optical system, the combination with a light transmitting master, of means including a concave cylindrical reflecting face and condensing and objective lenses for directing a plurality of light beams through a common area of said master to coincide and intensify one another subsequently to emerge as a combined image impressed light beam, and a screen area for said image impressed light beam and for receiving the image impressed light beam so produced.

AUGUST D. EITZEN.